(12) United States Patent
Beppu et al.

(10) Patent No.: US 7,976,921 B2
(45) Date of Patent: Jul. 12, 2011

(54) RELEASE AGENT COMPOSITION AND RELEASE LINER

(75) Inventors: Shiori Beppu, Warabi (JP); Toshio Sugizaki, Warabi (JP)

(73) Assignee: Lintec Corporation, Tokyo (JP)

( * ) Notice: Subject to any disclaimer, the term of this patent is extended or adjusted under 35 U.S.C. 154(b) by 1275 days.

(21) Appl. No.: 11/598,894

(22) Filed: Nov. 14, 2006

(65) Prior Publication Data

US 2007/0112142 A1 May 17, 2007

(30) Foreign Application Priority Data

Nov. 15, 2005 (JP) ................ 2005-330195

(51) Int. Cl.
- B32B 27/06 (2006.01)
- B32B 27/30 (2006.01)
- B32B 7/06 (2006.01)
- B32B 7/12 (2006.01)

(52) U.S. Cl. ............ 428/41.3; 428/41.5; 428/41.8; 428/352; 428/343; 428/500; 428/501; 428/507; 428/515; 428/521; 525/330.3; 525/330.5; 525/331.9; 525/332.5; 525/332.7; 525/333.1; 525/333.2; 525/333.3; 525/333.6; 525/374; 525/379; 525/385

(58) Field of Classification Search .......... 428/41.3, 428/41.5, 41.8, 352, 343, 500, 501, 507, 428/515, 521; 525/330.3, 330.5, 331.9, 332.5, 525/332.7, 333.1, 333.2, 333.3, 333.6, 374, 525/379, 385

See application file for complete search history.

(56) References Cited

U.S. PATENT DOCUMENTS 6,686,425 B2 * 2/2004 Wigdorski et al. ........ 526/329.6
2006/0154097 A1 * 7/2006 Amano et al. ............. 428/520

FOREIGN PATENT DOCUMENTS

| JP | 2000-290610 A | 10/2000 |
| JP | 2003-147327 A | 5/2003 |
| JP | 2003-183619 A | 7/2003 |

* cited by examiner

Primary Examiner — Roberto Rabago
(74) Attorney, Agent, or Firm — The Webb Law Firm

(57) ABSTRACT

A release agent composition includes a poly(meth)acrylate (A) containing a structural unit (1) represented by the following formula (1);

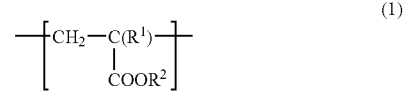

(1)

in which $R^1$ represents hydrogen or a methyl group and $R^2$ represents a long-chain alkyl group having 12 to 28 carbon atoms, a liquid polymer (B) and a crosslinking agent (C), wherein at least one of the poly(meth)acrylate (A) and the liquid polymer (B) has a reactive functional group, and the crosslinking agent (C) is a compound having a functional group capable of reacting with the reactive functional group.

24 Claims, No Drawings

RELEASE AGENT COMPOSITION AND RELEASE LINER

FIELD OF THE INVENTION

The present invention relates to a release agent composition and a release liner. More specifically, it relates to a release agent composition, which comprises a poly(meth)acrylate and a liquid polymer as major agents, and a crosslinking agent, and to a release liner having a release layer composed of the composition on a substrate.

BACKGROUND OF THE INVENTION

In production processes of semiconductor devices, pressure sensitive adhesive sheets have conventionally been used, and on a pressure sensitive adhesive layer of such a pressure sensitive adhesive sheet, a release liner having a release layer made from a release agent containing a silicone compound is generally laminated on a substrate for protecting the pressure sensitive adhesive layer.

However, silicone compounds generally have a property such that they easily migrate. Therefore, in semiconductor fields, when such a pressure sensitive adhesive sheet is used, it is considered that a silicone compound constituting a release layer migrates to a pressure sensitive adhesive layer to cause a defect on circuits of semiconductor devices and the like. Accordingly, a release liner having a release layer made from a release agent not containing a silicone compound has been desired.

For the release agent not containing such a silicone compound, there are proposed an alkyd resin release agent, an olefin resin release agent and a long chain alkyl group-having acryl resin release agent (hereinafter sometimes referred to as long chain alkyl release agent).

However, the alkyd resin release agent has a problem such that the use thereof is limited on adhesives because of having high peel strength, the olefin resin release agent has a problem such that a pressure sensitive adhesive layer cannot be formed on a release liner because of having inferior heat resistance, and the long chain alkyl release agent has a problem such that a pressure sensitive adhesive agent cannot be applied on a release liner because of having inferior solvent resistance and further has inferior adhesion to a substrate such as films or the like.

Under the circumstances, a release agent composition prepared by introducing an ultraviolet ray curable functional group in a long chain alkyl resin is proposed in order to solve the above problems in the long chain alkyl release agent (for example, referred to JP-A-2003-183619).

Furthermore, proposed are release agent compositions prepared by introducing a crosslinking functional group such as a hydroxyl group, carboxyl group or epoxy group into a long chain alkyl resin (for example, referred to JP-A-2003-147327 and JP-A-2000-290610). However, when such a crosslinking structure is formed by introducing a functional group into a long chain alkyl resin which is a major agent, the freedom of the long chain alkyl group is decreased so that the surface energy of a release layer is hard to be lowered and thereby it is difficult to control peel strength thereof.

It is an object of the invention to provide a release agent composition not having a bad influence upon electronic parts and the like and having excellent solvent resistance, heat resistance, release properties and adhesion to substrate, and it is another object of the invention to provide a release liner having a release layer made from the release agent composition.

SUMMARY OF THE INVENTION

The present inventors have been earnestly studied on the above objects. As a result, they found that a release agent composition capable of improving solvent resistance, heat resistance and adhesion to substrate, and also capable of controlling peel strength can be obtained by using, for major agents, a long chain alkyl group containing poly(meth)acrylate and a liquid polymer wherein at least one of them has a reactive functional group, and further using a specific crosslinking agent.

That is, the release agent composition of the present invention comprises:

a poly(meth)acrylate (A) containing a structural unit (1) represented by the following formula (1);

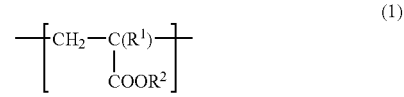

in which $R^1$ represents hydrogen or a methyl group and $R^2$ represents a long-chain alkyl group having 12 to 28 carbon atoms, a liquid polymer (B) and a crosslinking agent (C), wherein at least one of the poly(meth)acrylate (A) and the liquid polymer (B) has a reactive functional group, and the crosslinking agent (C) is a compound having a functional group capable of reacting with the reactive functional group.

Furthermore, in the release agent composition of the present invention, the weight ratio (A)/(B) of the poly(meth)acrylate (A) to the liquid polymer (B) is preferably in the range of 10/90 to 90/10 and the crosslinking agent (C) is preferably contained in an amount of from 0.01 to 50 parts by weight based on 100 parts by weight of the total amount of the poly(meth)acrylate (A) and the liquid polymer (B).

The poly(meth)acrylate (A) may comprise 10 to 100% by weight of the structural unit (1) and 0 to 90% by weight of a structural unit represented by the following formula (2);

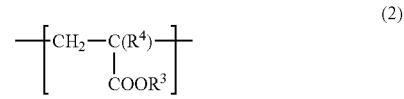

in which $R^4$ represents hydrogen or a methyl group and $R^3$ represents an alkyl group having 1 to 11 carbon atoms, which alkyl group may contain a fluorine atom, oxygen atom or nitrogen atom, provided that the total amount of the structural units (1) and (2) is 100% by weight.

The poly(meth)acrylate (A) further may comprise 0 to 50 parts by weight of a structural unit (3) derived from a (meth)acrylate containing a reactive functional group based on 100 parts by weight of the structural unit (1).

The liquid polymer (B) generally has a molecular weight of from 500 to 50,000. The liquid polymer (B) preferably has at least one skeleton selected from the group consisting of polybutadiene, polyisoprene and polystyrene, and is more preferably polybutadiene or polyisoprene each having a reactive functional group.

The reactive function group of the poly(meth) acrylate (A) is preferably a hydroxyl group, carboxyl group or amino group. The reactive functional group of the liquid polymer (B) is preferably a hydroxyl group, carboxyl group, amino group or acid anhydride group. The crosslinking agent (C) is preferably an isocyanate compound, amino compound, epoxy compound or metal compound. The release agent composition of the present invention further may comprise an organic solvent (D).

The release liner of the present invention comprises a substrate and, on at least one surface of the substrate, a release layer made from the above release agent composition.

Since the release agent composition of the present invention has excellent solvent resistance and heat resistance, a pressure sensitive adhesive layer can be formed by applying an solvent type pressure sensitive adhesive agent on a release liner having a release layer made from the composition. Furthermore, the release layer formed from the release agent composition of the present invention has excellent release properties and excellent adhesion to substrates such as films and the like.

According to the present invention, when using a poly (meth)acrylate having no active point to crosslinking reaction, a liquid polymer having an active point to crosslinking reaction and a crosslinking agent, a semi-IPN (interpenetrating polymer network) structure thereof is formed, the freedom of side chain of the poly(meth) acrylate is secured. Therefore, a release layer can be designed to lower the surface energy thereof and to enhance the adhesion with the side of a substrate. As a result, a gradient film, which is suitable as a release layer can be formed.

Moreover, according to the present invention, since the peel strength can be controlled by appropriately selecting the kind of a monomer, which is copolymerized with a long chain alkyl resin of a major agent or appropriately selecting the combination of a long chain alkyl resin and a liquid polymer as major agents, release liners can be prepared in accordance with various kinds of uses.

Furthermore, in the present invention, silicone compounds are not used. Therefore, even when a pressure sensitive adhesive sheet on which the release liner of the present invention is laminated is used in the preparation process of electronic parts such as semiconductor devices and the like, there is no fear of exerting bad influences caused by migration of silicone compounds to the electronic parts.

DETAILED DESCRIPTION OF THE INVENTION

The release agent composition and the release liner having a release layer formed from the composition according to the present invention will be described in detail hereinafter.
[Release Agent Composition]

The release agent composition of the present invention comprises, as major agents, a poly(meth)acrylate (A) and a liquid polymer (B), and a crosslinking agent (C), and further comprises an organic solvent (D). In the specification, the term "(meth)acryl" means both of acryl and methacryl. Each component is described below.

(A) Poly(meth)acrylate
<Structural Unit (1)>

In the release agent composition of the present invention, the poly(meth)acrylate (hereinafter sometimes referred to "polymer (A)", which is used as a major agent, contains a structural unit represented by the formula (1).

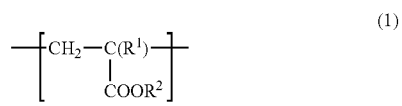

In the formula (1), $R^1$ represents hydrogen or a methyl group, and $R^2$ represents a long chain alkyl group having 12 to 28 carbon atoms.

When the carbon number of the alkyl group $R^2$ is less than 12, the release performance likely lowers, while when the number is over 28, difficulties occasionally arise in handling. Therefore, the polymer (A) has a long chain alkyl group having 12 to 28 carbon atoms so that not only a release layer having excellent release performance but also it is advantageous on handling properties.

A monomer capable of being the structural unit (1) (hereinafter sometimes referred to "monomer (1)") may be a (meth)acrylate in which the ester part is a long chain alkyl group having 12 to 28 carbon atoms, and examples thereof may include lauryl(meth)acrylate, myristyl(meth)acrylate, palmityl(meth)acrylate, stearyl(meth)acrylate, eicosyl(meth) acrylate, docosyl(meth)acrylate, tetracosyl(meth)acrylate, hexacosyl(meth)acrylate and octacosyl(meth)acrylate. These esters may be used singly or in combination with two or more.

Among the above (meth)acrylates, lauryl(meth)acrylate, myristyl(meth)acrylate, palmityl(meth)acrylate and stearyl (meth)acrylate are preferred.

<Structural Unit (2)>

The polymer (A) may comprises a structural unit (2) represented by the following formula (2) in accordance with necessity, as a structural unit other than the structural unit (1).

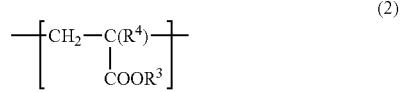

In the formula (2), $R^4$ represents hydrogen or a methyl group, and $R^3$ represents an alkyl group having 1 to 11 carbon atoms and the alkyl group may contain a fluorine atom, oxygen atom or nitrogen atom.

Examples of a monomer capable of being the structural unit (2) (hereinafter sometimes referred to "monomer (2)") may include methyl(meth)acrylate, ethyl(meth)acrylate, propyl(meth)acrylate, n-butyl(meth)acrylate, isobutyl(meth) acrylate, t-butyl(meth)acrylate, pentyl(meth)acrylate, isopentyl(meth)acrylate, hexyl(meth)acrylate, heptyl(meth) acrylate, n-octyl(meth)acrylate, isooctyl(meth)acrylate, 2-ethylhexyl(meth)acrylate, n-decyl(meth)acrylate, isodecyl (meth)acrylate, undecyl(meth)acrylate, 2-(perfluoro-octyl) ethyl(meth)acrylate, trifluoroethyl(meth)acrylate, pentafluoropropyl(meth)acrylate, 1H,1H-perfluoro-n-octyl(meth) acrylate, N,N-dimethylamino ethyl(meth)acrylate, N,N-dimethylamino propyl(meth)acrylate, ethyleneglycolmethylether (meth)acrylate, 2-ethoxyethyl (meth)acrylate and 2-butoxyethyl(meth)acrylate. These may be used singly or in combination with two or more.

When the total amount of the structural units (1) and (2) in the polymer (A) is 100% by weight, the content of the structural unit (1) is from 10 to 100% by weight, preferably 30 to 99% by weight, more preferably 40 to 90% by weight, and the content of the structural unit (2) is from 0 to 90% by weight, preferably 1 to 70% by weight, more preferably 10 to 60% by weight. When the polymer (A) contains the structural unit (2)

in the above amount, the peel strength of the release layer formed from the release agent composition containing the polymer (A) can be controlled.

<Structural Unit (3)>

The polymer (A) may comprise a structural unit derived from a (meth)acrylate containing a reactive functional group (hereinafter sometimes referred to "structural unit (3)") in accordance with necessity in addition to the structural units (1) and (2). Examples of the reactive functional group may include hydroxyl group, carboxyl group, amino group, epoxy group, chloro group and thiol group. These reactive functional groups may be contained singly or in combination with two or more. Of these groups, hydroxyl group, carboxyl group and amino group are preferred.

The monomer capable of being the structural unit (3) (hereinafter sometimes referred to "monomer (3)") is a (meth)acrylate having the above reactive functional group, and examples thereof may include:

hydroxyl group-containing (meth)acrylates such as hydroxyethyl(meth) acrylate, hydroxypropyl(meth) acrylate and hydroxybutyl(meth)acrylate;

carboxyl group-containing (meth)acrylates such as 1,4-di (meth)acryloxyethyl pyromellitic acid, 4-(meth)acryloxy ethyl trimellitic acid, N-(meth)acryloyl-p-aminobenzoic acid, 2-(meth)acryloyloxy benzoic acid, N-(meth)acryloyl-5-aminosalicylic acid, acrylic acid and methacrylic acid;

amino group-containing (meth) acrylates such as dimethyl aminoethyl(meth)acrylate, diethyl aminoethyl(meth)acrylate, dimethyl aminopropyl(meth)acrylate and diethyl aminopropyl(meth)acrylate;

epoxy group-containing (meth) acrylates such as glycidyl (meth)acrylate and 3,4-epoxybutyl(meth)acrylate;

chloro group-containing (meth)acrylates such as 3-chloro-2-hydroxypropyl(meth)acrylate, ethyl-2-(chloromethyl) acrylate, 4-chlorophenyl acrylate, methyl-α-chloroacrylate; and thiol group-containing (meth)acrylates such as 2-(methylthio)ethylmethacrylate. These monomers may be used singly or in combination with two or more.

The content of the structural unit (3) in the polymer (A) is generally from 0 to 50 parts by weight, preferably 0.1 to 30 parts by weight, more preferably 1 to 20 parts by weight based on 100 parts by weight of the structural unit (1). When the structural unit (3) is contained in the polymer (A) in the above amount, a crosslinking structure consisting of the major agents and the crosslinking agent can favorably be formed using a crosslinking agent having crosslinking reactivity to the above functional groups so that a release layer having excellent heat resistance, solvent resistance and adhesion to substrate can be formed.

<Production of Polymer (A)>

The polymer (A) can be produced using the monomer (1) and optionally the above other monomers by a known polymerization method such as emulsion polymerization or liquid polymerization. The combination of the above monomers can arbitrarily be selected, and examples of the combination are the monomers (1) and (2), the monomers (1) and (3), and the monomers (1), (2) and (3). Of course, the monomer (1) may be used singly. When the polymer (A) is a copolymer, the copolymer may be any of a random copolymer and a block copolymer.

The polymer (A) may be copolymerized with vinyl acetate, polystyrene and methacryloxypropyl trimethoxysilane in addition to the above monomers within not missing the object of the present invention.

The weight average molecular weight (Mw) of the polymer (A) used in the present invention is generally from 30,000 to 2,000,000, preferably 50,000 to 1,000,000. When the polymer (A) has the Mw in the above range, the release agent composition can be applied favorably and the release layer has good release performance.

(B) Liquid Polymer

In the release agent composition of the present invention, the liquid polymer (B) used as a major agent is not particularly limited as long as it is a liquid polymer having compatibility with the polymer (A), and examples thereof may include polybutadiene, polyisoprene, polychloroprene, polypentadiene, polybutene, polyisobutylene, polystyrene, isoprene-butadiene copolymer, styrene-isoprene copolymer, polyolefin and derivatives thereof. The liquid polymer (B) may be used singly or in combination with two or more.

The molecular weight of the liquid polymer (B) is generally from 500 to 50,000, preferably 500 to 45,000, more preferably 1,000 to 20,000. When the liquid polymer (B) has a molecular weight in the above range, the release agent composition has excellent compatibility with poly(meth) acrylates and excellent handling properties.

When the polymer (A) does not have a reactive functional group, the liquid polymer (B) needs to have a reactive functional group. Even when the polymer (A) has a reactive functional group, the liquid polymer (B) preferably has a reactive functional group. Examples of the reactive functional group may include hydroxyl group, carboxyl group, amino group, acid anhydride group, epoxy group, chloro group and thiol group. These reactive functional groups may be contained singly or with two or more kinds thereof. Of these, hydroxyl group, carboxyl group, amino group and acid anhydride are preferred.

The liquid polymer (B) is a polymer having at least one kind of skeletons selected from the group consisting of polybutadiene, polyisoprene and polystyrene. More preferable examples of the polymer are polybutadiene, polyisoprene and polystyrene which have a reactive functional group, and particularly preferable examples thereof are polybutadiene and polyisoprene which have a hydroxyl group at the end.

Commercially available examples of the liquid polymer (B) may include "Poly bd R-45HT", "Poly bd R-15HT", "Poly ip" and "Epol" manufactured by Idemitsu Kosan Co., Ltd. and "LIR-30, 50, 300", "LIR-310, 390", "LIR-200, 290", "LIR-403, 410" and "UC-1" manufactured by Kuraray Co., Ltd.

In the release agent composition of the present invention, the weight ratio (A)/(B) of the polymer (A) to the liquid polymer (B) is generally from 10/90 to 90/10, preferably 20/80 to 80/20, more preferably 40/60 to 60/40. Blending the polymer (A) and the liquid polymer (B) in the above weight ratio, a release layer having excellent solvent resistance, adhesion to substrate and heat resistance can be formed.

(C) Crosslinking Agent

The release agent composition of the present invention contains the crosslinking agent (C), and the crosslinking agent (C) is a compound having a functional group capable of reacting with the reactive functional group of at least one of the polymer (A) and the liquid polymer (B). Examples of the crosslinking agent may include an isocyanate compound, an amino compound, an epoxy compound, a metal compound and a silane compound. Among the compounds, the isocyanate compound, the amino compound, the epoxy compound and the metal compound are preferred.

The polymer (A) and/or the liquid polymer (B) are allowed to react with the crosslinking agent (C) to form a crosslinking structure and thereby the release layer is improved on solvent resistance, heat resistance and adhesion to substrate.

When the polymer (A) comprises only a structural unit not having a reactive functional group and the liquid polymer (B) has a reactive functional group, the polymer (A) is connected with the crosslinking structure formed by the reaction of the liquid polymer (B) and the crosslinking agent (C) to form a semi-IPN structure. By the formation, the freedom of sidechain of the polymer (A) is secured, so that the surface energy of the release layer can be designed to be low and thereby a release layer having excellent release properties and adhesion to substrate can be formed.

Examples of the isocyanate compound include diphenyl methane diisocyanate (MDI), tolylene diisocyanate (TDI), hexamethylene diisocyanate (HDI), isophorone diisocyanate IPDI), trimethyl hexamethylene diisocyanate (TMDI), xylene diisocyanate (XDI), naphthalene diisocyanate (NDI), trimethylolpropane (TMP) adduct TDI, TMP adduct HDI, TMP adduct IPDI and TMP adduct XDI.

Examples of the amino compound include ethylene diamine, tetramethylene diamine, hexamethylene diamine, N,N'-diphenylethylene diamine and p-xylene diamine.

Examples of the epoxy compound include N,N,N',N'-tetraglycidyl methaxylene diamine and 1,3-bis(N,N-diglycidyl aminomethyl)cyclohexane.

Examples of the metal compound include aluminium chelate compounds such as aluminum trisacetyl acetonate, aluminium ethyl acetoacetate-diisopropylate; titanium chelate compounds such as titanium tetraacetyl acetonate, titanium acetyl acetonate, titanium octylene glycolate, tetraisopropoxy titanium and tetramethoxy titanium; and trimethoxy aluminum.

Examples of the silane compound include tetramethoxy silane and tetraethoxy silane.

When the isocyanate compound is used, a catalyst may be used for accelerating the crosslinking reaction. The catalyst used herein is generally an amine catalyst or an organometallic catalyst, and specific examples are amine catalysts such as N,N-dimethyl cyclohexyl amine, triethyl amine, pyridine, N-methylmorpholine, N,N,N',N'-tetramethylethylene diamine, bis-2-dimethyl amino ether, triethylene diamine and triethanol amine, and organometallic catalysts such as tin(II) octanoate, tin(II) oleate, dibutyl tin diacetate, dibutyl tin dilaurate, dimethyl tin mercaptide, dimethyl tin dimaleate and lead octanoate.

The above catalysts may be used singly or in combination with two or more. The catalyst is used in an amount of generally from 0.001 to 5.0 parts by weight, preferably 0.01 to 1.0 part by weight based on 100 parts by weight of the crosslinking agent (C). Using the catalyst in the above amount, the crosslinking reaction can favorably be accelerated.

In the release agent composition of the present invention, although the amount of the crosslinking agent (C) used varies depending to the kind of the crosslinking agent used, the crosslinking agent (C) is used in an amount of generally from 0.01 to 50 parts by weight, preferably 0.05 to 10 parts by weight based on 100 parts by weight of the total amount of the polymer (A) and the liquid polymer (B). Using the crosslinking agent (C) in the above amount, a release layer having excellent solvent resistance, heat resistance and adhesion to substrate can be formed.

(D) Organic Solvent

The release agent composition of the present invention is obtainable by mixing or reacting the above components. Further, the release agent composition generally contains an organic solvent from the viewpoint of coating properties and handling properties. The organic solvent having good solubility with each component and incapable of reacting with each component can be used without particular limitation.

Examples of the organic solvent may include toluene, xylene, methanol, ethanol, isobutanol, n-butanol, ethyl acetate, methylethyl ketone, acetone, tetrahydrofuran, isopropanol, dimethyl formamide and N-methylpyrrolidone.

The above organic solvents may be used singly or in combination with two or more and are used in an amount such that the resin solid is from 1 to 60% by weight, preferably 1 to 20% by weight.

The release agent composition of the present invention may contain other additives such as antistatic agents, surface active agents, antioxidants, lubricants, flame retardants, colorants, light stabilizers and heat stabilizers within not missing the object of the present invention.

[Release Liner]

The release liner of the present invention has a release layer formed from the above release agent composition on a substrate. The substrates, which are generally used can be used without particular limitation. Examples of the substrates are films of resins such as polyethylene, polypropylene, polybutene, polybutadiene, vinyl chloride, polyethylene terephthalate, polyethylene naphthalate, polybutylene terephthalate, polyimide, polyether imide, polyether ketone, polyether ether ketone, ethylene-vinylacetate copolymer, ethylene (meth)acrylic acid copolymer, polycarbonate, polymethyl methacrylate, triacetyl cellulose and polynorbornene;

papers such as wood-free papers, lint-free papers, glassine papers, clay coated papers, resin coated papers, laminate papers (polyethylene laminated paper, polypropylene laminated paper); and non-woven fabrics and metal foils.

The thickness of the substrate varies depending to various kinds of uses and the substrate material. For example, when the film of resin is used as a substrate, the thickness thereof is generally from about 5 to 300 µm, preferably about 20 to 200 µm, and when the paper is used as a substrate, the thickness thereof is generally from about 20 to 450 g/m$^2$, preferably about 40 to 220 g/m$^2$ in terms of weighing.

The release layer can be formed by applying the above release agent composition on the substrate with a known method, for example, gravure coating method, roll coating method, blade coating method, knife coating method, bar coating method and spray coating method followed by drying. The thickness of the release layer is generally from 0.01 to 15 µm, preferably 0.05 to 10 µm.

The release layer thus formed has excellent solvent resistance, heat resistance and adhesion to substrate. The peel strength desired of the release layer varies depending to the kind of a material to be laminated on the release liner and various kinds of uses. For example, the desired peel strength can be obtained by regulating the kind and the amount of the structural unit (2) of the polymer (A) constituting the release agent composition.

The release liner of the present invention has the release layer having excellent solvent resistance, heat resistance, adhesion to substrate and release properties so that it can be used to various uses. For example, the release liner can be utilized to release papers in tacky products such as pressure sensitive adhesive sheets, tapes and labels, and casting papers used in the production of synthetic leather. In particular, since the release liner of the present invention does not contain silicone compounds in the release layer, it can favorably be used as a release liner of a pressure sensitive adhesive sheet used in the production of semiconductor devices and the like.

EXAMPLES

The present invention is described in more detail with reference to the following example below, but it is not limited by these examples.

The weight average molecular weight is a weight average molecular weight in terms of polystyrene determined by using a gel permeation chromatography (GPC) in the following conditions.
(Measuring Conditions)
GPC measuring apparatus: HLC-8020 manufactured by TOSOH CORPORATION.
GPC column (passing in the following order): manufactured by TOSOH CORPORATION.
  TSK guard column HXL-H
  TSK gel GMHXL (x2)
  TSK gel G2000HXL
Measuring solvent: tetrahydrofuran
Measuring Temperature: 40° C.

Example 1

To a 1 L flask equipped with a stirrer, a nitrogen introducing tube, a thermometer and a condenser, 100 g of stearyl acrylate, 0.5 g of azobisisobutyronitrile (AIBN) and 200 mL of toluene were added and subjected to polymerization reaction in a stream of nitrogen at 70° C. for 12 hr, to obtain polystearyl acrylate (hereinafter sometimes referred to "PSA"). The resulting PSA had a weight average molecular weight of 59,000.

To 100 g of the resulting PSA, 100 g of a commercially available hydroxyl group-containing polybutadiene (manufactured by Idemitsu Kosan Co., Ltd. "Poly bd R-45HT", number average molecular weight: 2800, hydroxyl group content: 0.83 mol/Kg) and 1.5 g of TMP adduct HDI (manufactured by Nippon Polyurethane Industry Co., Ltd. "Coronate HL") were added and diluted with toluene so that the solid content was 1% by weight, and thereby a release agent composition 1 was obtained.

The resulting release agent composition 1 was applied on a polyethylene terephthalate (PET) film having a thickness of 38 μm by means of a Myer bar so that the film thickness was 0.1 μm. Thereafter, the coated film was dried at 100° C. for 1 min to obtain a release film (release liner).

Example 2

To a 1 L flask equipped with a stirrer, a nitrogen introducing tube, a thermometer and a condenser, 50 g of stearyl acrylate, 50 g of n-butylacrylate, 0.89 g of AIBN, 100 mL of toluene and 100 mL of ethyl acetate were added and subjected to polymerization reaction in a stream of nitrogen at 70° C. for 12 hr, to obtain a copolymer of stearyl acrylate and n-butyl acrylate (hereinafter sometimes referred to "PSABA"). The resulting PSABA had a weight average molecular weight of 170,000.

To 100 g of the resulting PSABA, 100 g of a commercially available hydroxyl group-containing polybutadiene (manufactured by Idemitsu Kosan Co., Ltd. "Poly bd R-45HT", number average molecular weight: 2800, hydroxyl group content: 0.83 mol/Kg) and 1.5 g of TMP adduct HDI (manufactured by Nippon Polyurethane Industry Co., Ltd. "Coronate HL") were added and diluted with toluene so that the solid content was 1% by weight, and thereby a release agent composition 2 was obtained.

The resulting release agent composition 2 was applied on a PET film having a thickness of 38 μm by means of a Myer bar so that the film thickness was 0.1 μm. Thereafter, the coated film was dried at 100° C. for 1 min to obtain a release film (release liner).

Example 3

To a 1 L flask equipped with a stirrer, a nitrogen introducing tube, a thermometer and a condenser, 50 g of stearyl acrylate, 49 g of n-butylacrylate, 1 g of hydroxyethyl acrylate, 0.89 g of AIBN, 100 mL of toluene and 100 mL of ethyl acetate were added and subjected to polymerization reaction in a stream of nitrogen at 70° C. for 12 hr, to obtain a copolymer of stearyl acrylate, n-butyl acrylate and hydroxyacrylate (hereinafter sometimes referred to "PSABAHEA". The resulting PSABAHEA had a weight average molecular weight of 170,000.

To 100 g of the resulting PSABAHEA, 100 g of a commercially available hydroxyl group-containing polybutadiene (manufactured by Idemitsu Kosan Co., Ltd. "Poly bd R-45HT", number average molecular weight: 2800, hydroxyl group content: 0.83 mol/Kg) and 7.6 g of TMP adduct HDI (manufactured by Nippon Polyurethane Industry Co., Ltd. "Coronate HL") were added and diluted with toluene so that the solid content was 1% by weight, and thereby a release agent composition 3 was obtained.

The resulting release agent composition 3 was applied on a PET film having a thickness of 38 μm by means of a Myer bar so that the film thickness was 0.1 μm. Thereafter, the coated film was dried at 100° C. for 1 min to obtain a release film (release liner).

Example 4

To 100 g of the PSABAHEA prepared in Example 3, 100 g of a commercially available polybutadiene (manufactured by Kuraray Co., Ltd. "LIR-300", weight average molecular weight: 45,000, not having a reactive functional group) and 0.1 g of TMP adduct HDI (manufactured by Nippon Polyurethane Industry Co., Ltd. "Coronate HL") were added and diluted with toluene so that the solid content was 1% by weight, and thereby a release agent composition 4 was obtained.

The resulting release agent composition 4 was applied on a PET film having a thickness of 38 μm by means of a Myer bar so that the film thickness was 0.1 μm. Thereafter, the coated film was dried at 100° C. for 1 min to obtain a release film (release liner).

Example 5

To 100 g of the PSABA prepared in Example 2, 100 g of a commercially available acid anhydride group-containing polyisoprene (manufactured by Kuraray Co., Ltd. "LIR-403", weight average molecular weight: 25,000, the number of functional groups per molecule: 3) and 1.3 g of TMP adduct HDI (manufactured by Nippon Polyurethane Industry Co., Ltd. "Coronate HL") were added and diluted with toluene so that the solid content was 1% by weight, and thereby a release agent composition 5 was obtained.

The resulting release agent composition 5 was applied on a PET film having a thickness of 38 μm by means of a Myer bar so that the film thickness was 0.1 μm. Thereafter, the coated film was dried at 100° C. for 1 min to obtain a release film (release liner).

Comparative Example 1

100 g of the PSA prepared in Example 1 was diluted with toluene so that the solid content was 1% by weight, and thereby a release agent composition 6 was obtained.

The resulting release agent composition 6 was applied on a PET film having a thickness of 38 μm by means of a Myer bar so that the film thickness was 0.1 μm. Thereafter, the coated film was dried at 100° C. for 1 min to obtain a release film (release liner).

Comparative Example 2

To a 1 L flask equipped with a stirrer, a nitrogen introducing tube, a thermometer and a condenser, 100 g of iso-octyl acrylate, 0.45 g of AIBN and 200 mL of ethyl acetate were added and subjected to polymerization reaction in a stream of nitrogen at 70° C. for 12 hr, to obtain polyiso-octyl acrylate (hereinafter sometimes referred to "POA". The resulting POA had a weight average molecular weight of 86,000.

100 g of the resulting POA was diluted with ethyl acetate so that the solid content was 1% by weight, and thereby a release agent composition 7 was obtained.

The resulting release agent composition 7 was applied on a PET film having a thickness of 38 μm by means of a Myer bar so that the film thickness was 0.1 μm. Thereafter, the coated film was dried at 100° C. for 1 min to obtain a release film.

Comparative Example 3

To 100 g of the PSABA prepared in Example 2, 100 g of a commercially available polybutadiene (manufactured by Kuraray Co., Ltd. "LIR-300", weight average molecular weight: 45,000, not having a reactive functional group) was added and diluted with toluene so that the solid content was 1% by weight, and thereby a release agent composition 8 was obtained.

The resulting release agent composition 8 was applied on a PET film having a thickness of 38 μm by means of a Myer bar so that the film thickness was 0.1 μm. Thereafter, the coated film was dried at 100° C. for 1 min to obtain a release film (release liner).

<Evaluation>

The following evaluations were carried out on the release films prepared in Examples 1 to 5 and Comparative Examples 1 to 3. The results are shown in Table 1.

(Solvent Resistance)

On the layer (release layer) formed from there lease agent composition in the resulting release film, an acrylic pressure sensitive adhesive agent (manufactured by Toyo Ink Co., Ltd. "BPS-5127" was applied by the use of a test coater so that the thickness was 50 μm, and the coated film was dried at 100° C. for 2 min. Thereafter, the surface condition was visually observed. The film on which a change was not observed in particular was determined to be good, and the film in which the release layer was swelled was determined to be not good.

(Adhesion to Substrate)

According to the crosscut test (JIS K-5400), crosscuts were applied on the release layer of the resulting release film and a silicone pressure sensitive adhesive tape (manufactured by Lintec Co., Ltd. "C-206") was adhered on the crosscut release layer. When the tape was peeled off, the number of pieces remained on the substrate was used for evaluation.

(Release Properties)

On the release layer of the resulting release film, an acrylic pressure sensitive adhesive (manufactured by Toyo Ink Co., Ltd "BPS-5127") was applied in a thickness of 50 μm using a test coater and dried at 100° C. for 2 min. Thereafter, a PET film having a thickness of 50 μm was stuck with the release layer of the film and then the peel strength thereof was measured in accordance with JIS Z0237.

(Heat Resistance)

On the release layer of the resulting release film, an acrylic pressure sensitive adhesive (manufactured by Toyo Ink Co., Ltd "BPS-5127") was applied in a thickness of 50 μm using a test coater and dried at 100° C. for 2 min. Thereafter, a PET film having a thickness of 50 μm was stuck with the release layer of the film and allowed to stand at 40° C. under a pressure of 100 g/cm² for 2 days and then the peel strength thereof was measured in accordance with JIS Z0237.

TABLE 1

| | Polymer (A) | Liquid polymer (B) | Solvent resistance | Substrate adhesion [piece] | release properties [N/20 mm] | Heat resistance [N/20 mm] |
|---|---|---|---|---|---|---|
| Ex. 1 | PSA | *1 | good | 100/100 | 0.33 | 0.56 |
| Ex. 2 | PSABA | *1 | good | 100/100 | 0.17 | 0.15 |
| Ex. 3 | PSABAHEA | *1 | good | 100/100 | 0.16 | 0.20 |
| Ex. 4 | PSABAHEA | *2 | good | 100/100 | 8.40 | 10.0 |
| Ex. 5 | PSABA | *3 | good | 100/100 | 0.15 | 0.22 |
| Comp. Ex. 1 | PSA | none | not good | 100/100 | 0.26 | 6.22 |
| Comp. Ex. 2 | POA | none | not good | 70/100 | 13.5 | 15.5 |
| Comp. Ex. 3 | PSABA | *2 | not good | 70/100 | 7.40 | 8.67 |

*1: Hydroxyl group-containing polybutadiene ("Poly bd R-45HT" manufactured by Idemitsu Kosan Co., Ltd.)
*2: Polybutadiene without reactive functional group ("LIR-300" manufactured by Kuraray Co., Ltd.)
*3: Acid anhydride group-containing polyisoprene ("LIR-403" manufactured by Kuraray Co., Ltd.)

As shown in Table 1, the release layers of the release agent compositions prepared in Examples 1 to 5 have excellent solvent resistance and adhesion to substrate and further the change in the peel strength before and after the heat resistant test was small. Therefore, it was confirmed that the release layers also have excellent heat resistance.

The invention claimed is:

1. A release liner comprising a substrate and, on at least one surface thereof, a release layer for laminating a pressure sensitive adhesive layer,
wherein the release layer is formed from a release agent composition comprising:
a poly(meth)acrylate (A) containing a structural unit (1) represented by the following formula (1);

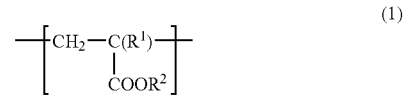

in which $R^1$ represents hydrogen or a methyl group and $R^2$ represents a long-chain alkyl group having 12 to 28 carbon atoms,
a liquid polymer (B) and
a crosslinking agent (C), wherein the poly(meth)acrylate (A) has a reactive functional group, the liquid polymer (B) has a no reactive functional group, the crosslinking agent (C) is a compound having a functional group capable of reacting with the reactive functional group, and wherein a crosslinking structure is formed in the release layer by a reaction of the poly(meth)acrylate (A) with the crosslinking agent (C).

2. The release liner according to claim 1, wherein the weight ratio (A)/(B) of the poly(meth)acrylate (A) to the liquid polymer (B) is in the range of 10/90 to 90/10, and the crosslinking agent (C) is contained in an amount of from 0.01 to 50 parts by weight based on 100 parts by weight of the total amount of the poly(meth)acrylate (A) and the liquid polymer (B).

3. A release liner comprising a substrate and, on at least one surface thereof, a release layer for laminating a pressure sensitive adhesive layer, wherein the release layer is formed from a release agent composition comprising:

a poly(meth)acrylate (A) containing a structural unit (1) represented by the following formula (1);

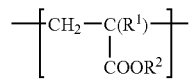

(1)

in which $R^1$ represents hydrogen or a methyl group and $R^2$ represents a long-chain alkyl group having 12 to 28 carbon atoms, a liquid polymer (B) and a crosslinking agent (C), wherein at least one of the poly(meth)acrylate (A) and the liquid polymer (B) has a reactive functional group, and the crosslinking agent (C) is a compound having a functional group capable of reacting with the reactive functional group, and wherein a crosslinking structure is formed in the release layer by a reaction of the poly(meth)acrylate (A) and/or the liquid polymer (B) with the crosslinking agent (C), wherein the poly(meth)acrylate (A) comprises 10 to 100% by weight of the structural unit (1) and 0 to 90% by weight of a structural unit represented by the following formula (2);

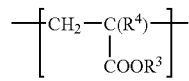

(2)

in which $R^4$ represents hydrogen or a methyl group and $R^3$ represents an alkyl group having 1 to 11 carbon atoms, which alkyl group may contain a fluorine atom, oxygen atom or nitrogen atom, provided that the total amount of the structural units (1) and (2) is 100% by weight.

4. The release liner according to claim 1, wherein the poly(meth)acrylate (A) further comprises 0 to 50 parts by weight of a structural unit (3) derived from a (meth)acrylate containing a reactive functional group based on 100 parts by weight of the structural unit (1).

5. The release liner according to claim 1, wherein the liquid polymer (B) has a molecular weight of from 500 to 50,000.

6. The release liner according to claim 1, wherein the liquid polymer (B) has at least one skeleton selected from the group consisting of polybutadiene, polyisoprene and polystyrene.

7. The release liner according to claim 1, wherein the reactive functional group of the poly(meth)acrylate (A) is a hydroxyl group, carboxyl group or amino group.

8. The release liner according to claim 1, wherein the crosslinking agent (C) is an isocyanate compound, amino compound, epoxy compound or metal compound.

9. A release liner comprising a substrate and, on at least one surface thereof, a release layer for laminating a pressure sensitive adhesive layer, wherein the release layer is formed from a release agent composition comprising:

a poly(meth)acrylate (A) containing a structural unit (1) represented by the following formula (1);

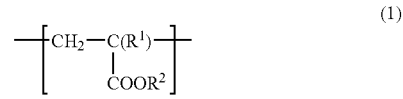

(1)

in which $R^1$ represents hydrogen or a methyl group and $R^2$ represents a long-chain alkyl group having 12 to 28 carbon atoms, a liquid polymer (B) and a crosslinking agent (C), wherein the poly(meth)acrylate (A) has no reactive functional group, the liquid polymer (B) has a reactive functional group, and the crosslinking agent (C) is a compound having a functional group capable of reacting with the reactive functional group, and wherein a crosslinking structure is formed in the release layer by a reaction of the liquid polymer (B) with the crosslinking agent (C).

10. A release liner comprising:

a substrate, a release layer provided on at least one surface of the substrate and a pressure sensitive adhesive layer provided on the release layer;

wherein the release layer is formed from a release agent composition comprising:

a poly(meth)acrylate (A) containing a structural unit (1) represented by the following formula (1)

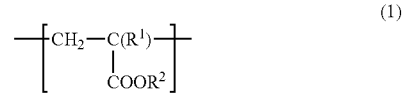

(1)

in which $R^1$ represents hydrogen or a methyl group and $R^2$ represents a long-chain alkyl group having 12 to 28 carbon atoms, a liquid polymer (B) and a crosslinking agent (C), wherein at least one of the poly(meth)acrylate (A) and the liquid polymer (B) has a reactive functional group, and the crosslinking agent (C) is a compound having a functional group capable of reacting with the reactive functional group, and wherein a crosslinking structure is formed in the release layer by a reaction of the poly(meth)acrylate (A) and/or the liquid polymer (B) with the crosslinking agent (C).

11. A release liner according to claim 10, wherein the pressure sensitive adhesive layer is formed from an acrylic pressure sensitive adhesive agent.

12. A release liner according to claim 10, wherein the reactive functional group of the liquid polymer (B) is a hydroxyl group, carboxyl group, amino group or acid anhydride group.

13. The release liner according to claim 3, wherein the weight ratio (A)/(B) of the poly(meth)acrylate (A) to the liquid polymer (B) is in the range of 10/90 to 90/10, and the crosslinking agent (C) is contained in an amount of from 0.01 to 50 parts by weight based on 100 parts by weight of the total amount of the poly(meth)acrylate (A) and the liquid polymer (B).

14. The release liner according to claim 3, wherein the liquid polymer (B) has a molecular weight of from 500 to 50,000.

15. The release liner according to claim 3, wherein the liquid polymer (B) has at least one skeleton selected from the group consisting of polybutadiene, polyisoprene and polystyrene.

16. The release liner according to claim 9, wherein the liquid polymer (B) has a molecular weight of from 500 to 50,000.

17. The release liner according to claim 9, wherein the liquid polymer (B) has at least one skeleton selected from the group consisting of polybutadiene, polyisoprene and polystyrene.

18. The release liner according to claim 9, wherein the reactive functional group of the liquid polymer (B) is a hydroxyl group, carboxyl group, amino group or acid anhydride group.

19. The release liner according to claim 10, wherein the weight ratio (A)/(B) of the poly(meth)acrylate (A) to the liquid polymer (B) is in the range of 10/90 to 90/10, and the crosslinking agent (C) is contained in an amount of from 0.01 to 50 parts by weight based on 100 parts by weight of the total amount of the poly(meth)acrylate (A) and the liquid polymer (B).

20. The release liner according to claim 10, wherein the poly(meth)acrylate (A) further comprises 0 to 50 parts by weight of a structural unit (3) derived from a (meth)acrylate containing a reactive functional group based on 100 parts by weight of the structural unit (1).

21. The release liner according to claim 10, wherein the liquid polymer (B) has a molecular weight of from 500 to 50,000.

22. The release liner according to claim 10, wherein the liquid polymer (B) has at least one skeleton selected from the group consisting of polybutadiene, polyisoprene and polystyrene.

23. The release liner according to claim 10, wherein the reactive functional group of the poly(meth)acrylate (A) is a hydroxyl group, carboxyl group or amino group.

24. The release liner according to claim 10, wherein the crosslinking agent (C) is an isocyanate compound, amino compound, epoxy compound or metal compound.

* * * * *